(12) United States Patent
Roh

(10) Patent No.: US 11,858,518 B2
(45) Date of Patent: Jan. 2, 2024

(54) RADAR DEVICE FOR VEHICLE AND METHOD OF CONTROLLING RADAR FOR VEHICLE

(71) Applicant: HYUNDAI MOBIS CO., LTD., Seoul (KR)

(72) Inventor: Hee Chang Roh, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 159 days.

(21) Appl. No.: 17/380,411

(22) Filed: Jul. 20, 2021

(65) Prior Publication Data

US 2022/0017100 A1 Jan. 20, 2022

(30) Foreign Application Priority Data

Jul. 20, 2020 (KR) .................. 10-2020-0089617

(51) Int. Cl.
*B60W 40/09* (2012.01)
*G06V 20/58* (2022.01)

(52) U.S. Cl.
CPC ............ *B60W 40/09* (2013.01); *G06V 20/58* (2022.01); *B60W 2420/42* (2013.01); *B60W 2420/52* (2013.01); *B60W 2552/53* (2020.02)

(58) Field of Classification Search
CPC ......... B60W 2420/42; B60W 2420/52; B60W 2552/53; B60W 40/09; B60W 60/0025; B60W 60/00276; B60W 2554/4029; B60W 2554/4048; B60W 2554/4049; B60W 30/09; B60W 30/095; G01S 13/86; G01S 13/867; G01S 13/931; G01S 2013/93271; G01S 2013/93272; G01S 7/412; G01S 2013/9315; G06V 20/58; G06V 20/588

See application file for complete search history.

(56) References Cited

U.S. PATENT DOCUMENTS

| | | | | |
|---|---|---|---|---|
| 9,056,395 | B1* | 6/2015 | Ferguson | G08G 1/167 |
| 10,782,405 | B2* | 9/2020 | Kim | G06V 10/147 |
| 10,829,123 | B2* | 11/2020 | You | G06V 20/588 |
| 10,859,684 | B1* | 12/2020 | Nabatchian | G06T 7/13 |
| 11,087,494 | B1* | 8/2021 | Srinivasan | G06V 20/584 |
| 11,328,444 | B2* | 5/2022 | Yamazaki | G01C 3/14 |
| 11,592,570 | B2* | 2/2023 | Zhu | G06V 20/56 |
| 2009/0135047 | A1* | 5/2009 | Matsuura | G01S 17/931 342/70 |
| 2011/0221628 | A1* | 9/2011 | Kamo | G01S 7/295 342/123 |

(Continued)

FOREIGN PATENT DOCUMENTS

| | | | |
|---|---|---|---|
| CN | 112119329 A | * 12/2020 | |
| DE | 102007020998 A1 | * 5/2008 | G01S 7/4004 |

(Continued)

*Primary Examiner* — Babar Sarwar
(74) *Attorney, Agent, or Firm* — NSIP Law

(57) ABSTRACT

A radar device for a vehicle includes: a radar sensor disposed on either one or both of a front surface of a vehicle and a rear surface of the vehicle, and configured to emit an electromagnetic wave signal toward a road having a lane at least partially containing an electromagnetic wave absorbing paint; and a radar control unit configured to determine whether a target is an object, the road, or the lane, based on an intensity of an electromagnetic wave reflected by the object, the road, or the lane, by using a radar signal received from the radar sensor.

13 Claims, 3 Drawing Sheets

(56) References Cited

U.S. PATENT DOCUMENTS

| | | | |
|---|---|---|---|
| 2011/0248880 A1* | 10/2011 | Miyahara | G01S 7/4802 |
| | | | 342/54 |
| 2014/0063232 A1* | 3/2014 | Fairfield | B62D 6/00 |
| | | | 382/104 |
| 2017/0199274 A1* | 7/2017 | Sasabuchi | G01S 13/867 |
| 2017/0299397 A1* | 10/2017 | Ichikawa | B60R 11/04 |
| 2018/0114074 A1* | 4/2018 | Baba | G01S 7/412 |
| 2018/0149740 A1* | 5/2018 | Tamura | G01S 13/867 |
| 2018/0172825 A1* | 6/2018 | Hsu | G01S 7/411 |
| 2019/0023267 A1* | 1/2019 | Takagi | G01S 7/415 |
| 2019/0101621 A1* | 4/2019 | Machida | G01S 13/931 |
| 2019/0243382 A1* | 8/2019 | Takaki | G01C 21/3476 |
| 2019/0285743 A1* | 9/2019 | Kaino | G01S 13/424 |
| 2020/0033470 A1* | 1/2020 | Brankovic | G01S 7/412 |
| 2020/0211219 A1* | 7/2020 | Yamazaki | G01S 17/87 |
| 2020/0249316 A1* | 8/2020 | Harrison | G01S 13/931 |
| 2020/0284887 A1* | 9/2020 | Wachter | G01S 17/10 |
| 2020/0326460 A1* | 10/2020 | Kim | E01F 9/30 |
| 2020/0341130 A1* | 10/2020 | Hayashi | G01S 13/282 |
| 2021/0192841 A1* | 6/2021 | Hu | G01S 13/867 |
| 2021/0195112 A1* | 6/2021 | Verghese | B60W 30/0956 |
| 2021/0206398 A1* | 7/2021 | Cheon | B60W 30/095 |
| 2021/0370928 A1* | 12/2021 | Lee | B60W 30/0956 |
| 2021/0394781 A1* | 12/2021 | Li | B60W 30/09 |
| 2021/0406722 A1* | 12/2021 | Armstrong-Crews | |
| | | | G06N 3/045 |
| 2022/0017100 A1* | 1/2022 | Roh | G01S 13/867 |

FOREIGN PATENT DOCUMENTS

| | | | | |
|---|---|---|---|---|
| DE | 102014223259 B4 | * | 10/2021 | B60W 40/06 |
| EP | 2058678 A2 | * | 5/2009 | G01S 17/42 |
| EP | 3306340 B1 | * | 6/2021 | G01S 13/42 |
| WO | WO-03073125 A1 | * | 9/2003 | G01S 13/60 |
| WO | WO-2013157123 A1 | * | 10/2013 | G01S 13/931 |
| WO | WO-2020158508 A1 | * | 8/2020 | G01S 13/04 |

* cited by examiner

RADAR DEVICE FOR VEHICLE AND METHOD OF CONTROLLING RADAR FOR VEHICLE

CROSS-REFERENCE TO RELATED APPLICATIONS

This application claims the benefit under 35 U.S.C. § 119(a) of Korean Patent Application No. 10-2020-0089617 filed on Jul. 20, 2020 in the Korean Intellectual Property Office, the entire disclosure of which is incorporated herein by reference for all purposes.

BACKGROUND

Technical Field

The present disclosure relates to a radar device for a vehicle and a method of controlling radar for a vehicle.

Background Art

The contents described in this section merely provide background information for the present disclosure and do not constitute the related art.

Recently, as safety and convenience functions for drivers, such as adaptive cruise control (ACC), autonomous emergency braking (AEB), and autonomous parking, have increased, the development of sensors for understanding situations around a vehicle is being actively developed. Sensors attached to the vehicle include an image sensor, LiDAR, radar, an ultrasonic sensor, or the like. Among these sensors, an image sensor for detecting a lane has a problem in that the image sensor does not accurately detect a lane at night or in rainy weather and therefore has low reliability, and may not accurately recognize a lane in a location where a lane marking is peeled off.

In addition, there is a problem in that when the image sensor determines situations around a vehicle, the image sensor may not precisely measure an azimuth and an elevation angle and has low lane detection accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, radar device for a vehicle includes: a radar sensor disposed on either one or both of a front surface of a vehicle and a rear surface of the vehicle, and configured to emit an electromagnetic wave signal toward a road having a lane at least partially containing an electromagnetic wave absorbing paint; and a radar control unit configured to determine whether a target is an object, the road, or the lane, based on an intensity of an electromagnetic wave reflected by the object, the road, or the lane, by using a radar signal received from the radar sensor.

The radar control unit may be further configured to: determine that the target is the object or the road, in response to the intensity of the electromagnetic wave exceeding a first reference value; and determine that the target is the lane, in response to the intensity of the electromagnetic wave being equal to or less than the first reference value.

The radar control unit may be further configured to: determine that the target is the object, in response to the intensity of the electromagnetic wave exceeding a second reference value greater than the first reference value; and determine that the target is the road, in response to the intensity of the electromagnetic wave being equal to or less than the second reference value and exceeding the first reference value.

The radar control unit may be further configured to: determine that the object is the vehicle or a roadside facility, in response to the intensity of the electromagnetic wave exceeding a third reference value greater than the second reference value; and determine that the object is an animal or a pedestrian, in response to the intensity of the electromagnetic wave being equal to or less than the third reference value and exceeding the second reference value.

The radar device may further include an image sensor disposed on either one or both of the front surface of the vehicle and the rear surface of the vehicle, and configured to photograph a view in an outward direction of the vehicle. The radar control unit may be further configured to determine information on the object, the road, or the lane based on the radar signal and an image signal received from the image sensor, in a condition in which a driving environment is in a day state. The radar control unit may be further configured to determine the information on the object, the road, or the lane by using the radar signal, in a condition in which the driving environment is in a night state.

The radar device may further include an illuminance sensor disposed in the vehicle and configured to measure illuminance to generate illuminance information. The radar control unit may be further configured to determine that the driving environment is in the day state or the night state, based on the illuminance information.

The radar control unit may be further configured to determine that the driving environment is in the day state, in response to the illuminance information exceeding a preset illuminance reference value. The radar control unit may be further configured to determine that the driving environment is in the night state, in response to the illuminance information being equal to or less than the preset illuminance reference value.

The radar device may further include a rain sensor disposed in the vehicle and configured to measure rain to generate rain information. The radar control unit may be further configured to determine whether the driving environment is in a rainy state, based on the rain information measured by the rain sensor.

The radar control unit may be further configured to determine that the driving environment is in the rainy state, in response to the rain information exceeding a preset rain reference value. The radar control unit may be further configured to determine that the driving environment is not in the rainy state, in response to the rain information being equal to or less than the rain reference value.

In another general aspect, a method of controlling radar for a vehicle includes: detecting an intensity of an electromagnetic wave reflected by a target, using a radar sensor; and determining the target as an object, a road, or a lane, based on the intensity of the electromagnetic wave. The determining of the target as the object, the road, or the lane includes: determining the target as the object or the road, in response to the intensity of the electromagnetic wave exceeding a first reference value; and determining the target as the lane, in response to the intensity of the electromagnetic wave being equal to or less than the first reference value.

The determining of the target as the object or the road may include: determining the target as the object, in response to the intensity of the electromagnetic wave exceeding a second reference value greater than the first reference value; and determining the target as the road, in response to the intensity of the electromagnetic wave being equal to or less than the second reference value and exceeding the first reference value.

The determining the target as the object may include: determining the object as a vehicle or a roadside facility, in response to the intensity of the electromagnetic wave exceeding a third reference value greater than the second reference value; and determining the object as an animal or a pedestrian, in response to the intensity of the electromagnetic wave being equal to or less than the third reference value and exceeding the second reference value.

In another general aspect, a non-transitory, computer-readable storage medium stores instructions that, when executed by a processor, cause the processor to perform the method described above.

Other features and aspects will be apparent from the following detailed description, the drawings, and the claims.

DETAILED DESCRIPTION

Figure 1:
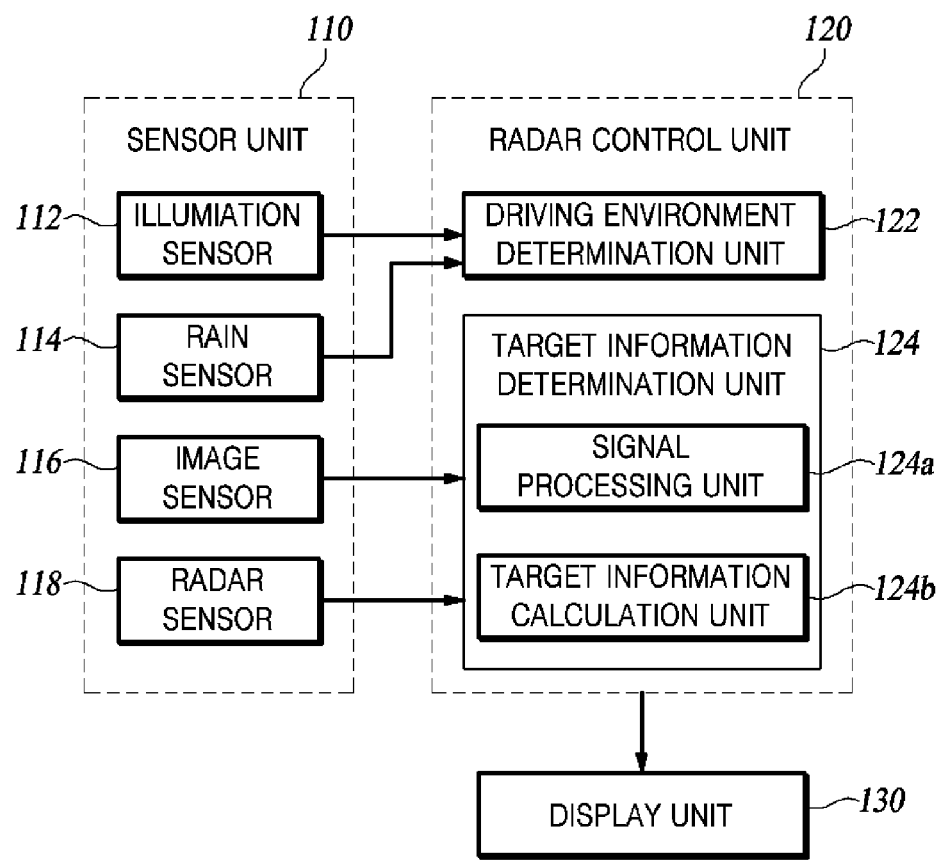
FIG. 1 is a block diagram of a radar device according to an embodiment of the present disclosure.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric code such as first, second, i), ii), (a), (b), etc., in numbering components are used solely for the purpose of differentiating one component from the other but not to imply or suggest the substances, the order or sequence of the components. Throughout this specification, when a part "includes" or "comprises" a component, the part is meant to further include other components, not excluding thereof unless there is an explicit description contrary thereto.

FIG. 1 is a block diagram of a radar device according to an embodiment of the present disclosure.

Referring to FIG. 1, a radar device 100 includes all or some of a sensor unit 110, a radar control unit 120, and a display unit 130.

The sensor unit 110 includes an illuminance sensor 112, a rain sensor 114, an image sensor 116, and a radar sensor 118. The plurality of sensors included in the sensor unit 110 measures driving environment information, identification information, and the like. Here, the driving environment information may be illuminance, a falling speed of rainwater, an amount of rainwater, and the like. On the other hand, identification information refers to information on objects around a vehicle, such as lanes, vehicles, and roads, when the vehicle is driving.

The illuminance sensor 112 is a sensor for detecting illuminance. Here, the illuminance means a density of a light flux measured based on sensitivity of an eye. More specifically, the illuminance refers to the amount of light received by a unit area for a unit time. Although various photocells may be used as the illuminance sensor 112, a phototube or the like is also used for measuring very low illuminance.

The illuminance sensor 112 according to the embodiment of the present disclosure transmits illuminance information generated by sensing illuminance to the radar control unit 120. The radar control unit 120 determines whether a driving environment is day or night using the received illuminance information.

The rain sensor 114 is a sensor that detects a falling amount and a falling speed of rainwater falling on a vehicle. The rain sensor 114 is applied to reduce the possibility of an accident or inconvenience in driving that may occur when a driver turns his/her eyes or makes an unnecessary operation in order to control whether or not the driver operates a wiper or an operation speed of the wiper while driving.

When rainwater falls on a windshield of a vehicle, the rain sensor 114 detects the amount and falling speed of rainwater using infrared rays by a sensor installed in an upper center of the windshield.

The rain sensor 114 transmits rain information generated using the falling speed or the like of rainwater to the radar control unit 120. The radar control unit 120 determines whether the driving environment is a rainy state using the received rain information.

A plurality of image sensors 116 may be disposed on front, rear, and left and right surfaces of a vehicle. The image sensor 116 may be disposed in a vehicle to be utilized for various functions, such as a blind spot detection function, an emergency collision prevention function, and a parking collision prevention function.

The image sensor 116 transmits image information generated by photographing views in an outward direction of the vehicle, that is, spatial information, to the radar control unit 120.

A plurality of radar sensors 118 may be disposed on the front, rear, and left and right surfaces of the vehicle. The radar sensor 118 may be disposed in a vehicle to be utilized for various functions, such as a forward vehicle tracking function, a blind spot detection function, an emergency collision prevention function, and a parking collision prevention function.

The radar sensor 118 may include a plurality of transmitting units and a plurality of receiving units. The radar signals transmitted from the transmitting units of one or more radar sensors 118 may be received by all of the plurality of receiving units. That is, the radar sensor 118 may have a radar structure of a multi-input multi-output (MIMO) system. Each radar sensor 118 may have a field of view (FOV) of 118° to 160°.

The radar sensor 118 may be an ultra wide band (UWB) radar sensor that transmits and receives a radar signal in an ultra wide frequency band, or a frequency modulated continuous-wave (FMCW) radar sensor that transmits and receives a radar signal including a modulated frequency signal. The radar sensor 118 may adjust a detection range by adjusting an output value of a transmission signal using an amplifier (not illustrated) disposed therein.

The radar control unit 120 includes a driving environment determination unit 122 and a target information determination unit 124.

The radar control unit 120 obtains an input signal for control from a driver and determines whether to start a control operation. When the input signal for control is received, the radar control unit 120 may determine whether to start a control operation based on the input signal. The input signal may be any signal for starting a control operation. For example, the input signal may be a button input signal or a touchpad input signal for activating a control function. In addition, the input signal is not limited thereto and includes any signal for starting control. In addition, the radar control unit 120 also determines whether the operation of the radar sensor 118 is started.

The driving environment determination unit 122 determines the driving environment using a signal transmitted by the sensor unit 110, for example, driving environment information. For example, whether the driving environment is a day state or a night state is determined using illuminance information, or whether the driving environment is a rainy state is determined using the rain information. The operation of determining the rainy state and the day or night state will be described in more detail with reference to FIG. 3.

The radar control unit 120 determines which of the image information measured by the image sensor 116 and the radar information measured by the radar sensor 118 to use first according to the driving environment determined by the driving environment determination unit 122.

For example, when the image sensor 116 is able to detect and distinguish lanes with high accuracy by clearly capturing the surroundings of the vehicle, the image sensor 116 uses both the image information and the radar information and uses the radar information when it is not possible to accurately distinguish lanes, roads, or the like.

In the detailed description of the present disclosure, when the image sensor 116 cannot accurately distinguish lanes, roads, or the like, it means, for example, the driving environment is a rainy state and a night state, and when the image sensor 116 is able to accurately distinguish lanes and roads, it means, for example, the driving environment is a day state. The operation of determining the night state and the rainy state will be described in detail with reference to FIG. 3.

The target information determination unit 124 includes a signal processing unit 124a that removes clutter included in a signal received by the radar sensor 118 and a target information calculation unit 124b that calculates target information based on the signal processed by the signal processing unit 124a. Here, the clutter means unwanted noise that is reflected and received from an object that is not a radar target.

The radar control unit 120 may control the radar sensor 118 to change a frequency bandwidth of the radar signal transmitted by the radar sensor 118, a detection angle of the radar sensor 118, or a detection range of the radar sensor 118. For example, when the control operation is started, the radar control unit 120 may control the radar sensor 118 electronically or mechanically to change at least one of the detection angle and the detection range detected by the radar sensor 118.

The signal processing unit 124a removes signal components except for a frequency band corresponding to the radar signal transmitted by the radar sensor 118 using a band-pass filter. A moving average method may be used to remove the clutter. Here, the moving average method is a method of knowing the overall trend by using an average value of data on a time series in a certain period.

A filtering method for the signal processing unit 124a to remove the clutter is not limited thereto, and those skilled in the art may add, remove, or change other types of filters.

Also, the signal processing unit 124a may increase the resolution of the display unit 130 by extending the frequency bandwidth of the transmitted radar signal.

The target information determination unit 124 receives the signal processed by the signal processing unit 124a and determines the target.

An operation of determining, by the target information determination unit 124, the target and transmitting information on the determined target to the radar control unit 120 will be described in more detail. When the radar sensor 118 detects the electromagnetic waves reflected from the target and transmits the detected electromagnetic waves to the radar control unit 120, the target information determination unit 124 determines the information on the target and a distance, azimuth, or the like from the vehicle according to the intensity of the electromagnetic waves.

Among a first reference value, a second reference value, and a third reference value, the first reference value is the smallest, the second reference value is second smallest, and the third reference value is the largest. For each reference value according to an embodiment of the present disclosure, the first reference value may be −100 dBsm, the second reference value may be −10 dBsm, and the third reference value may be 10 dBsm.

For example, when the intensity of the reflected electromagnetic wave is less than or equal to the first reference value or the electromagnetic wave is not reflected, the target information determination unit 124 determines that the target is a lane.

On the other hand, when the intensity of the reflected electromagnetic wave exceeds the first reference value and is equal to or less than the second reference value, the target information determination unit 124 determines that the target is a road.

Meanwhile, when the intensity of the reflected electromagnetic wave exceeds the second reference value and is equal to or less than the third reference value, the target information determination unit 124 determines that the target is a pedestrian or an animal.

Finally, when the intensity of the reflected electromagnetic wave exceeds the third reference value, the target information determination unit 124 determines that the target is a vehicle or a roadside facility.

The reason why the target information determination unit 124 determines that the target is a lane will be described in more detail. When a lane or a crosswalk sign of a general road is coated with an electromagnetic wave absorbing material, even when the radar sensor 118 of the vehicle transmits a radar signal, the transmitted radar signal, for example, the electromagnetic wave, is absorbed by the lane coated with the absorbing material, and the transmitted radar signal is not reflected or the intensity of the electromagnetic wave is insignificant even when the transmitted radar signal is reflected. Accordingly, the target information determination unit 124 may determine that the target is a lane.

Meanwhile, the target information determination unit 124 may determine a distance and an azimuth between the vehicle and the target by using the reflected radar signal. Conventional techniques related to the calculation of the distance and azimuth are obvious to those skilled in the art, and thus, illustrations and descriptions thereof will be omitted.

After the target information determination unit 124 determines the target, the determination result, for example, the target information, is transmitted to the radar control unit 120.

The radar control unit 120 transmits image information to the display unit 130 so that the target information is displayed to a driver as dots and lines and displayed through the display unit.

The display unit 130 displays the image signal received from the radar control unit 120 through the display screen.

Figure 2:
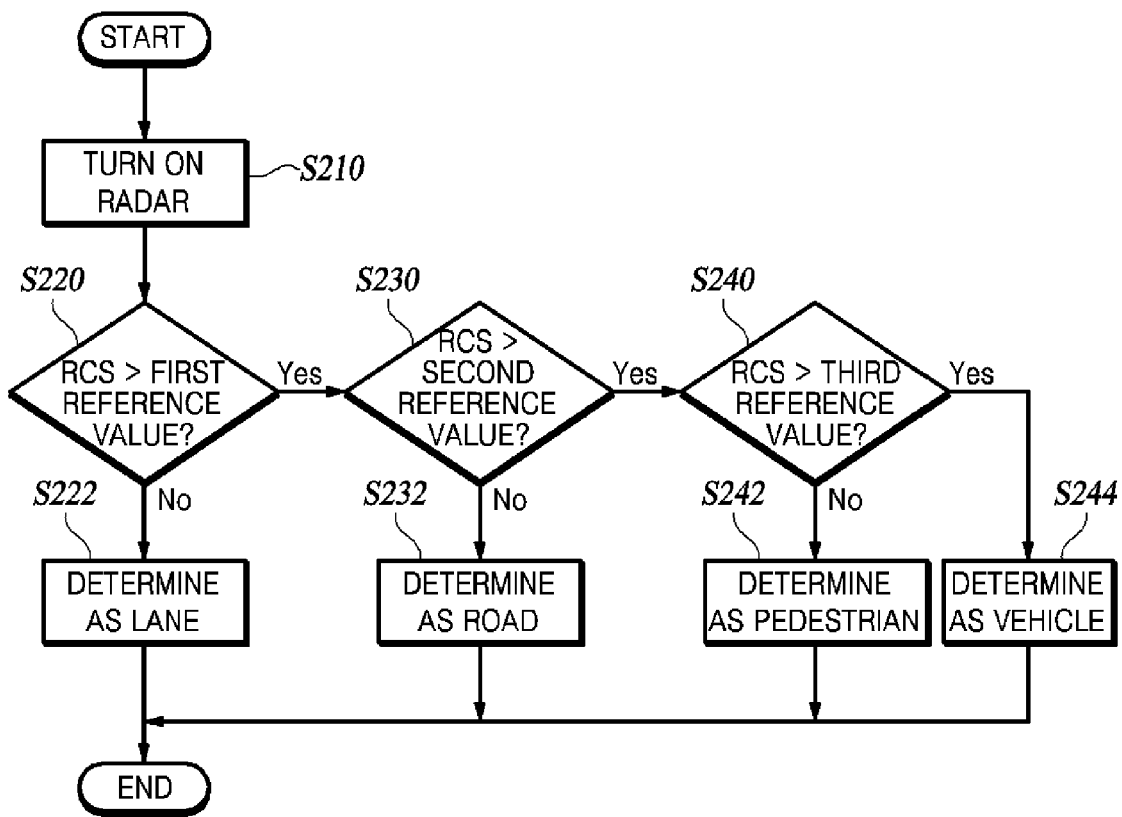
FIG. 2 is a flowchart illustrating an operation of determining, by a radar control unit, target information according to an embodiment of the present disclosure.

FIG. 2 is a flowchart illustrating an operation of determining, by a radar control unit, target information according to an embodiment of the present disclosure.

In the detailed description of the present disclosure, dBsm means decibel/m$^2$. For example, X dBsm is calculated as $\log(X \times m^2)$.

Meanwhile, in the detailed description of the present disclosure, a radar cross section (RCS) is a measure indicating how well an object is reflected by radar as an area.

The radar control unit 120 may measure the RCS to determine how large a target captured by the radar appears as an object on the radar signal.

The radar control unit 120 according to the embodiment of the present disclosure determines whether the object is one of a vehicle, a pedestrian, a road, and a lane according to a size of the RCS reflected from the object.

Describing this in more detail, the radar control unit 120 determines whether to start radar control. Whether to start the control may be determined by acquiring an input signal for control from a driver and determining whether to start a radar control operation based on the input signal. For example, when the driver inputs a control start signal using the radar information or the image information, the radar control unit 120 starts the operation of the radar sensor 118 (S210).

The radar control unit 120 determines whether the RCS value measured by the radar sensor is greater than the first reference value (S220). Here, the first reference value may be, for example, −100 dBsm.

When the RCS measurement value is less than or equal to the first reference value, the radar control unit 120 determines that the target is a lane (S222).

When the RCS measurement value exceeds the first reference value, the radar control unit 120 determines whether the RCS value measured by the radar sensor is greater than the second reference value (S230). Here, the second reference value may be, for example, −10 dBsm.

When the RCS measurement value is equal to or less than the second reference value and exceeds the first reference value, the radar control unit 120 determines that the target is a road.

Meanwhile, when the measurement value exceeds the second reference value, the radar control unit 120 determines whether the RCS value measured by the radar sensor is greater than the third reference value (S240).

When the RCS measurement value is equal to or less than the third reference value and exceeds the second reference value, the radar control unit 120 determines that the target is a pedestrian or an animal.

Meanwhile, when the RCS measurement value exceeds the third reference value, the radar control unit 120 determines that the target is a vehicle or a roadside facility (S244).

When the radar control unit 120 completes object determination, the present algorithm ends.

Figure 3:
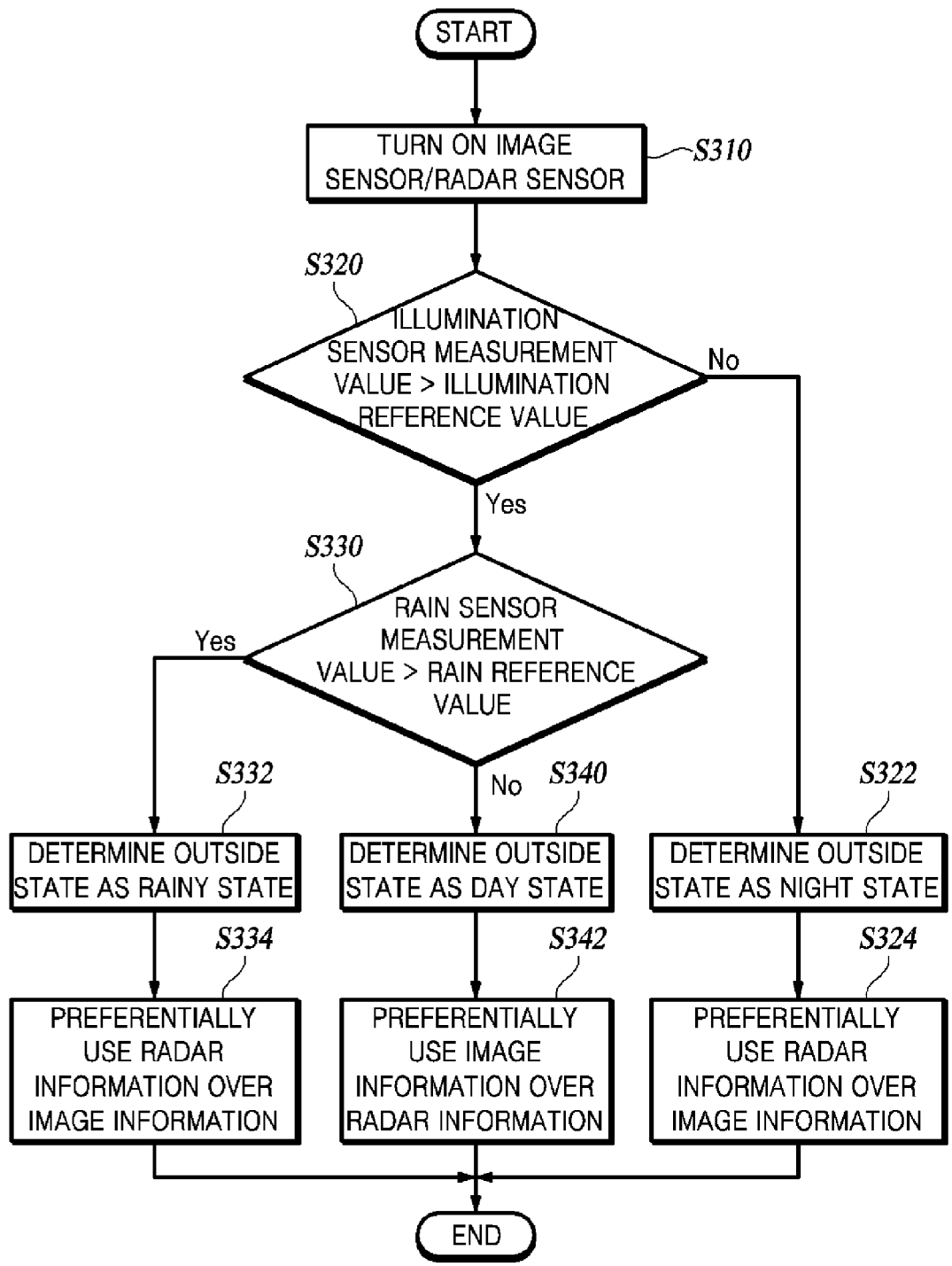
FIG. 3 is a flowchart illustrating an operation of determining, by a radar control unit, a driving environment according to an embodiment of the present disclosure.

FIG. 3 is a flowchart illustrating an operation of determining, by a radar control unit, a driving environment according to an embodiment of the present disclosure.

Referring to FIG. 3, the radar control unit 120 according to the embodiment of the present disclosure determines driving environment information using illuminance information or rain information.

The radar control unit 120 determines whether to start the control. Whether to start the control may be determined by acquiring an input signal for control from a driver and determining whether to start a control operation based on the input signal. For example, when the driver inputs the control start signal using the radar information or the image information, the radar control unit 120 starts the operation of the image sensor 116 and the radar sensor 118 (S310).

When the control is started, the illuminance sensor 112 detects the illuminance outside the vehicle and transmits the generated illuminance information to the radar control unit 120. The radar control unit 120 performs an operation of determining whether an illuminance value in the illuminance information generated by the illuminance sensor 112 exceeds an illuminance reference value (S320).

When the illuminance value is less than or equal to the illuminance reference value, the radar control unit 120 determines that the outside is a night state (S322). When it is determined that the outside is the night state, the radar control unit 120 controls the display unit 130 to display views in an outward direction of the vehicle to the driver by preferentially using the radar information over the image information (S324). The reason why is when the outside is the night state, it is difficult for the image sensor 116 to recognize a lane and a road with high accuracy, and thus, the accuracy in determining the driving environment information is deteriorated. Therefore, in the operation S324, since the control unit determines that the external state is the night state, the information measured by the radar sensor 118 is preferentially used over the image information measured by the image sensor 116.

Meanwhile, when the illuminance value exceeds the illuminance reference value, the radar control unit 120 performs an operation of determining whether the rain information measured by the rain sensor 114, for example, the falling speed of rainwater or the amount of rainwater exceeds the rain reference value (S330).

When the amount or the falling speed of rainwater exceeds the rain reference value, the radar control unit 120 determines that the outside is the rainy state (S332). When it is determined that the outside is the rainy state, the radar control unit 120 preferentially uses the radar information over the image information (S334). The reason why is, when the outside is the rainy state, it is difficult for the image sensor 116 to clearly recognize a lane and a road, and thus, the accuracy in determining the driving environment information is deteriorated. Therefore, in the operation S334, since the control unit determines that the external state is the rainy state, the information measured by the radar sensor 118 is preferentially used over the image information measured by the image sensor 116.

Meanwhile, in the case of determining that the illuminance value exceeds the illuminance reference value, when it is determined that the amount or falling speed of rainwater is less than or equal to the rain reference value, it is determined that the outside is a day state without rain (S340). When it is determined that the outside is the day state, the radar control unit 120 uses both the image information and the radar information to control the display unit 130 to display views in an outward direction of the vehicle to the driver. In this case, the image information is used preferentially, and the radar information is also used to increase accuracy (S342). The reason why is, when the outside is the night state or the rainy weather, the image sensor may not clearly recognize the lane and the road, and thus the accuracy in determining the driving environment information is deteriorated, but when the outside is the day time, the image sensor 116 may accurately recognize the road and the land, and thus the image information measured by the image sensor is preferentially used in operation S342.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

REFERENCE NUMERALS

100: radar device
110: sensor unit
112: illumination sensor
114: rain sensor
116: image sensor
118: radar sensor
120: radar control unit
122: driving environment determination unit
124: target information determination unit
124*a*: signal processing unit
124*b*: target information calculation unit
130: display unit

What is claimed is:

1. A radar device for a vehicle, comprising:
a radar sensor disposed on either one or both of a front surface of a vehicle and a rear surface of the vehicle, and configured to emit an electromagnetic wave signal toward a road having a lane at least partially containing an electromagnetic wave absorbing paint and capture radar information;
an image sensor configured to photograph capture image information of a view in an outward direction of the vehicle; and
one or more processors configured to determine whether to use the image information and the radar information in response to a determination that the image information is insufficient to accurately distinguish whether the target is an object, the road, or the lane.

2. The radar device of claim 1, wherein the one or more processors are further configured to:
determine whether the target is the object, the road, or the lane based on an intensity of an electromagnetic wave reflected by the object, the road, or the lane, by using a radar signal received from the radar sensor;
determine that the target is the object or the road, in response to the intensity of the electromagnetic wave exceeding a first reference value; and
determine that the target is the lane, in response to the intensity of the electromagnetic wave being equal to or less than the first reference value.

3. The radar device of claim 2, wherein the one or more processors are further configured to:
determine that the target is the object, in response to the intensity of the electromagnetic wave exceeding a second reference value greater than the first reference value; and
determine that the target is the road, in response to the intensity of the electromagnetic wave being equal to or less than the second reference value and exceeding the first reference value.

4. The radar device of claim 3, wherein the one or more processors are further configured to:
determine that the object is the vehicle or a roadside facility, in response to the intensity of the electromagnetic wave exceeding a third reference value greater than the second reference value; and
determine that the object is an animal or a pedestrian, in response to the intensity of the electromagnetic wave being equal to or less than the third reference value and exceeding the second reference value.

5. The radar device of claim 1,
wherein the one or more processors are further configured to determine information on the object, the road, or the lane based on the radar signal and an image signal received from the image sensor, in a condition in which a driving environment is in a day state, and
wherein the one or more processors are further configured to determine the information on the object, the road, or the lane by using the radar signal, in a condition in which the driving environment is in a night state.

6. The radar device of claim 5, further comprising an illuminance sensor disposed in the vehicle and configured to measure illuminance to generate illuminance information,
wherein the one or more processors are further configured to determine that the driving environment is in the day state or the night state, based on the illuminance information.

7. The radar device of claim 6, wherein the one or more processors are further configured to determine that the driving environment is in the day state, in response to the illuminance information exceeding a preset illuminance reference value, and
wherein the one or more processors are further configured to determine that the driving environment is in the night state, in response to the illuminance information being equal to or less than the preset illuminance reference value.

8. The radar device of claim 5, further comprising a rain sensor disposed in the vehicle and configured to measure rain to generate rain information,
wherein the one or more processors are further configured to determine whether the driving environment is in a rainy state, based on the rain information measured by the rain sensor.

9. The radar device of claim 8, wherein the one or more processors are further configured to determine that the driving environment is in the rainy state, in response to the rain information exceeding a preset rain reference value, and
wherein the one or more processors are further configured to determine that the driving environment is not in the rainy state, in response to the rain information being equal to or less than the rain reference value.

10. A method of controlling radar for a vehicle, comprising:
detecting an intensity of an electromagnetic wave reflected by a target, using a radar sensor;
capturing at least one image, using an image sensor; and determining the target as an object, a road, or a lane, based on the intensity of the electromagnetic wave and image information from the at least one image, wherein, the determining of the target as the object, the road, or the lane comprises:

determining whether the image information is sufficient to accurately distinguish whether the target is the object, the road, or the lane, and in response to a determination that the image information is insufficient to accurately distinguish whether the target is the object, the road, or the lane;

determining the target as the object or the road, in response to the intensity of the electromagnetic wave exceeding a first reference value; and determining the target as the lane, in response to the intensity of the electromagnetic wave being equal to or less than the first reference value.

11. The method of claim 10, wherein the determining of the target as the object or the road comprises:

determining the target as the object, in response to the intensity of the electromagnetic wave exceeding a second reference value greater than the first reference value; and determining the target as the road, in response to the intensity of the electromagnetic wave being equal to or less than the second reference value and exceeding the first reference value.

12. The method of claim 11, wherein the determining of the target as the object comprises:

determining the object as a vehicle or a roadside facility, in response to the intensity of the electromagnetic wave exceeding a third reference value greater than the second reference value; and determining the object as an animal or a pedestrian, in response to the intensity of the electromagnetic wave being equal to or less than the third reference value and exceeding the second reference value.

13. A non-transitory, computer-readable storage medium storing instructions that, when executed by a processor, cause the processor to perform the method of claim 10.

* * * * *